(12) United States Patent  (10) Patent No.: US 9,107,383 B2
Khalili  (45) Date of Patent: Aug. 18, 2015

(54) TIDY CAT LITTER BOX

(71) Applicant: Kevin Khalili, Santa Barbara, CA (US)

(72) Inventor: Kevin Khalili, Santa Barbara, CA (US)

( * ) Notice: Subject to any disclaimer, the term of this patent is extended or adjusted under 35 U.S.C. 154(b) by 130 days.

(21) Appl. No.: 14/022,139

(22) Filed: Sep. 9, 2013

(65) Prior Publication Data

US 2014/0069342 A1  Mar. 13, 2014

Related U.S. Application Data

(60) Provisional application No. 61/698,688, filed on Sep. 9, 2012.

(51) Int. Cl.
*A01K 1/01* (2006.01)
*A01K 29/00* (2006.01)

(52) U.S. Cl.
CPC ............. *A01K 1/0107* (2013.01); *A01K 1/0114* (2013.01)

(58) Field of Classification Search
CPC ........................... A01K 1/0107; A01K 1/0125
USPC ........ 119/165, 168, 166, 482, 498, 499, 28.5, 119/416
IPC ........................... A01K 29/00, 31/00, 1/00, 1/03
See application file for complete search history.

(56) References Cited

U.S. PATENT DOCUMENTS

| | | |
|---|---|---|
| 3,885,523 A | 5/1975 | Coleman |
| 4,190,525 A | 2/1980 | Menzel |
| 5,092,277 A | 3/1992 | Baillie |
| 5,195,464 A | 3/1993 | Mutter |
| 5,211,133 A | 5/1993 | Foley |
| 5,261,650 A | 11/1993 | Hein |
| 5,329,878 A | 7/1994 | McCauley |
| 5,361,725 A | 11/1994 | Baillie |
| 5,388,550 A * | 2/1995 | Noble ............................ 119/165 |
| 5,471,950 A | 12/1995 | White |
| D370,316 S | 5/1996 | Merino |
| 5,515,812 A | 5/1996 | Faust |
| D373,663 S | 9/1996 | Walter |
| 5,572,950 A * | 11/1996 | O'Rourke et al. ............. 119/165 |
| 5,676,090 A | 10/1997 | Cannady, Jr. |
| 5,701,845 A | 12/1997 | Jablonski |
| 5,806,461 A | 9/1998 | Kiera |
| 6,176,201 B1 | 1/2001 | Fields |
| 6,295,949 B1 | 10/2001 | Willis |
| 6,371,048 B1 | 4/2002 | Smith |
| 6,408,790 B1 | 6/2002 | Maguire |
| 6,412,440 B2 | 7/2002 | Kobayashi |
| 6,439,165 B1 | 8/2002 | Guard |
| D463,887 S | 10/2002 | Walter |
| 6,474,262 B1 | 11/2002 | Ceccon |

(Continued)

*Primary Examiner* — Shadi Baniani
*Assistant Examiner* — Magdalena Topolski
(74) *Attorney, Agent, or Firm* — Guy Cumberbatch

(57) ABSTRACT

A tidy pet litter box having a plurality of internal screens across which the pet must traverse when entering or leaving a main basin of the litter box. An upper lid fits over a lower tray, the upper lid having a large front opening. The lower tray defines a large main basin in which litter is placed, and a secondary basin at a rear end thereof. An entrance screen mounted laterally across side walls of the upper lid extends from a lower end of the front opening substantially over the entire main basin and permits passage of a pet to a rear screen located above the secondary basin. To exit, the pet must jump up to the rear screen, then over the entrance screen which dislodges any litter sticking to its paws so that it falls back into the main basin. A method of training a cat to use the litter box by first removing the entrance screen is also disclosed.

20 Claims, 8 Drawing Sheets

(56) References Cited

U.S. PATENT DOCUMENTS

| | | |
|---|---|---|
| D467,041 S | 12/2002 | Cortes-Reuter |
| 6,659,045 B2 | 12/2003 | Thompson |
| 6,925,961 B2 * | 8/2005 | Langdale ............... 119/166 |
| 6,951,190 B2 | 10/2005 | Northrop |
| 7,011,042 B2 | 3/2006 | Martello |
| D527,498 S | 8/2006 | Lewis |
| 7,207,292 B1 | 4/2007 | Colten |
| 7,267,077 B1 | 9/2007 | Brassfield |
| 7,434,539 B2 | 10/2008 | Gloor |
| D591,463 S | 4/2009 | Plante |
| D625,057 S | 10/2010 | Teper |
| 7,987,818 B2 | 8/2011 | Matsuo |
| D646,444 S | 10/2011 | Lawson |
| D651,772 S | 1/2012 | Weber |
| 2002/0112670 A1 | 8/2002 | Wheelwright |
| 2004/0129230 A1 | 7/2004 | Northrop |
| 2005/0211179 A1 | 9/2005 | Lewis |
| 2008/0022938 A1 * | 1/2008 | Callan ............... 119/165 |
| 2008/0035069 A1 | 2/2008 | Yamamoto |
| 2009/0000556 A1 | 1/2009 | Matsuo |
| 2009/0000558 A1 | 1/2009 | Matsuo |
| 2009/0000560 A1 | 1/2009 | Matsuo |
| 2009/0250014 A1 | 10/2009 | Juan |

\* cited by examiner

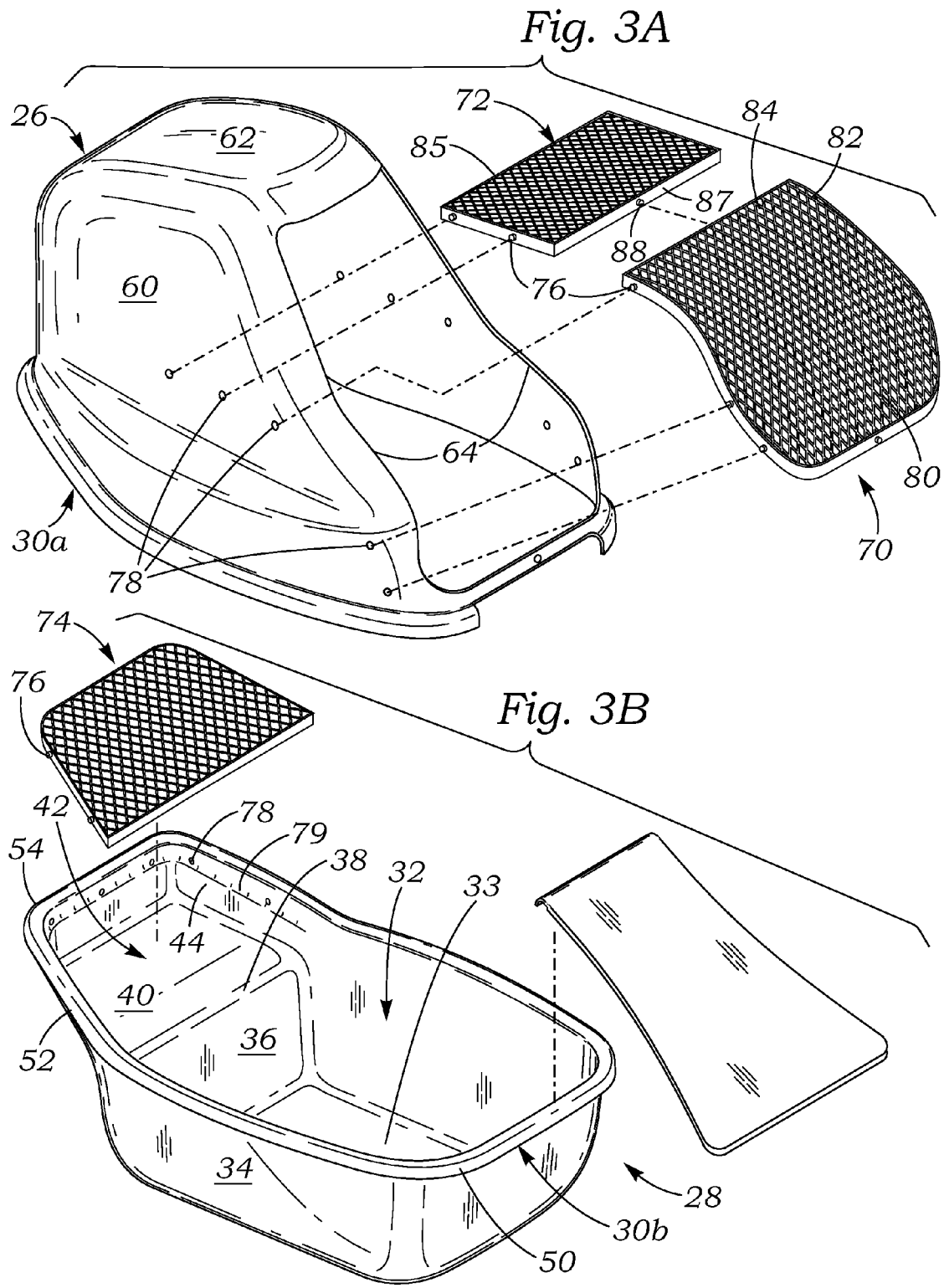

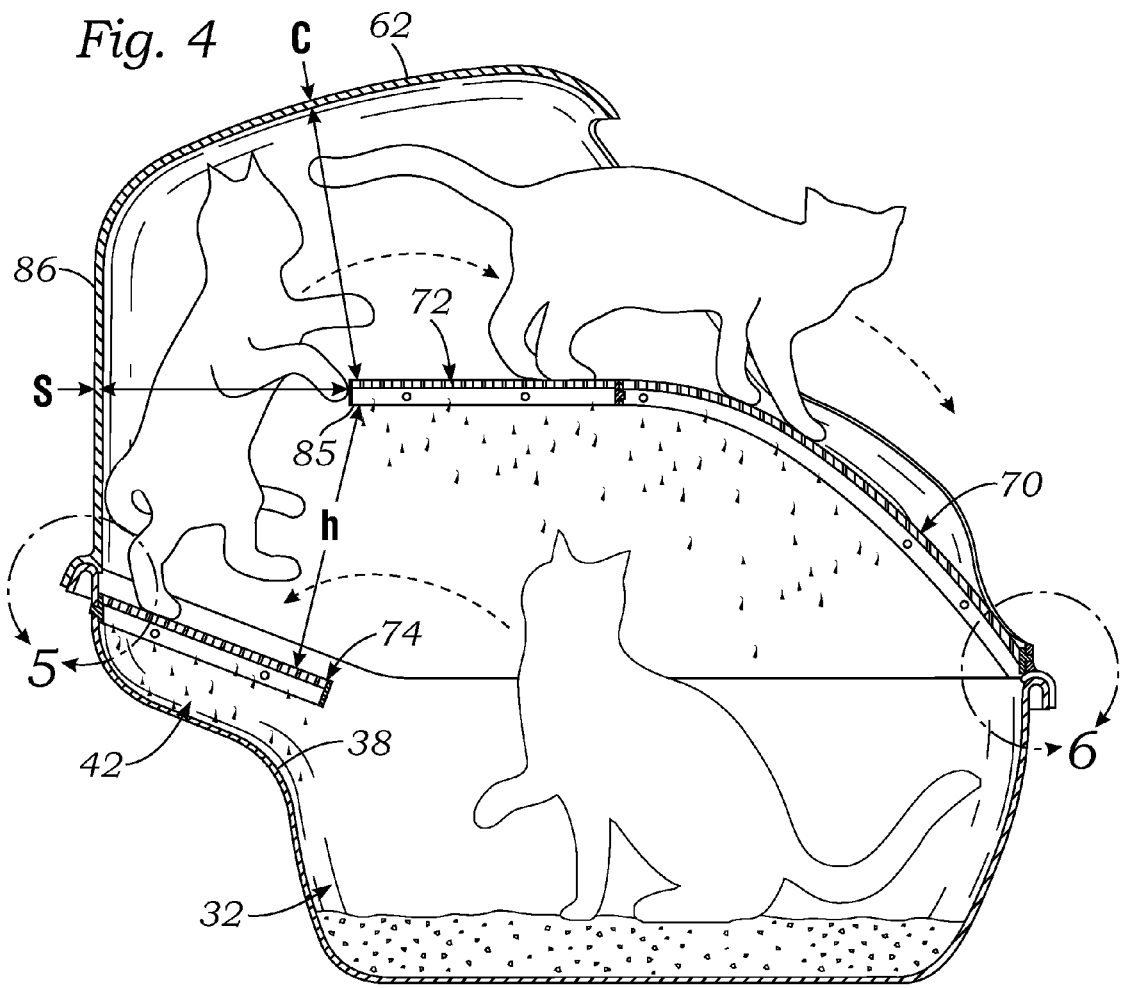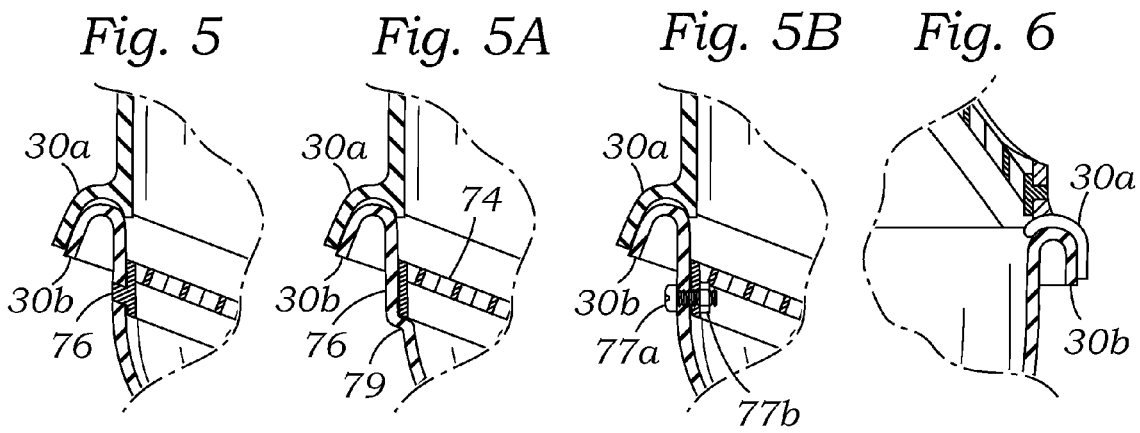

TIDY CAT LITTER BOX

The present application claims priority under 35 U.S.C. §119 to U.S. Provisional Application Ser. No. 61/698,688, filed Sep. 9, 2012.

FIELD OF THE INVENTION

The present invention relates to litter boxes for pets, such as cats and, more particularly, to a litter box that prevents the spread of litter around the box.

BACKGROUND OF THE INVENTION

It is common to keep domesticated cats almost exclusively indoors. Thus cats are easily trained to relieve themselves in a given location, such as a litter box filled with an absorbent, granular material or "litter." A conventional cat litter box receives litter into which a cat evacuates, the litter functioning to absorb moisture and form clumps for removal. Unfortunately, keeping the soiled litter inside the litter box is a problem, since cats tend to scratch and shift the litter to cover the eliminated waste, which causes litter to spray out of the cat litter box. Furthermore, litter particles stick to the cat's paws and are thus carried out of the litter tray by the cat into the surrounding room, resulting in the need for frequent cleaning of the room.

Many attempts have been made to keep the litter from the box from spreading around the surrounding room. For instance, U.S. Pat. No. 5,676,090, issued to Earl W. Cannady, Jr. on Oct. 14, 1997, discloses a SCATTER-RESISTANT LITTER BOX. Cannady presents an enclosed base unit with an opening in one end of the cover unit. A raised ramp below the opening is covered with a carpet like material to trap litter carried on an animal's feet, thereby preventing the litter from being carried from the box. Other solutions are seen in, for example, U.S. Pat. No. 5,092,277 to Baillie, U.S. Pat. No. 6,371,048 to Smith, and U.S. Pat. No. 6,412,440 to Kobayashi, and in U.S. Patent Publication No. 2009/0250014 to Juan.

Despite the wide variety of cat litter box designs that have been developed over the years in an attempt to reduce litter mess, there remains a need for a more effective and economical model. Furthermore, there remains a need for methods of use of new cat litter boxes which will speed acceptance by the cat.

SUMMARY OF THE INVENTION

The present application provides a tidy pet litter box having a plurality of internal screens across which the pet must traverse when entering or leaving a main basin of the litter box. An upper lid fits over a lower tray, the upper lid having a large front opening. The lower tray defines a large main basin in which litter is placed, and a secondary basin at a rear end thereof. An entrance screen mounted laterally across side walls of the upper lid extends from a lower end of the front opening substantially over the entire main basin and permits passage of a pet to a rear screen located above the secondary basin. To exit, the pet must jump up to the rear screen, then over the entrance screen which dislodges any litter sticking to its paws so that it falls back into the main basin.

In one exemplary embodiment, the present application provides a pet litter box having an enclosure defining a lower main basin sized to contain litter and a secondary basin raised up from the main basin at a rear of the enclosure. The enclosure further includes a lid over the main basin and secondary basin having a front opening large enough to permit passage of a pet. An entrance screen spans laterally between side walls of the enclosure and is positioned at the front opening. The entrance screen extends from the front opening into an interior volume with a generally horizontal section above a floor of the main basin and below a top wall of the lid. The entrance screen further defines a front edge and a rear edge and a front to rear length therebetween such that the entrance screen extends over substantially the entire main basin. A rear screen spans laterally between side walls of the enclosure and is positioned above a floor of the secondary basin. The rear screen extends from a rear end of the enclosure to a location approximately aligned with the rear edge of the entrance screen, and is spaced vertically below the entrance screen a height sufficient to permit passage of a pet therebetween. A pet must therefore enter across the entrance screen and step downward onto the rear screen to get to the main basin where the litter is placed. The path of exit is in the reverse, thus causing the pet to walk over both the screens on its way out which helps reduce mess.

In accordance with another aspect of the present application, a pet litter box has a lower tray defining a main basin sized to contain litter and a secondary basin raised up from the main basin at a rear end of the tray. The lower tray has a lip surrounding a top edge which mates with a lip surrounding a bottom edge of an upper lid to form an enclosure. The upper lid extends above the main and secondary basins and has a front opening. An entrance screen spans laterally between side walls of the upper lid and extends from the front opening into an interior volume of the enclosure with a generally horizontal section above a floor of the main basin. The entrance screen further includes a front edge and a rear edge and a front to rear length therebetween such that the entrance screen extends over substantially the entire main basin. Finally, a rear screen spans laterally between side walls of the lower tray and is positioned above a floor of the secondary basin. The rear screen extends from a rear end of the lower tray to a location approximately aligned with the rear edge of the entrance screen, and is spaced vertically below the entrance screen a height sufficient to permit passage of a pet therebetween. Again, to exit the enclosure a pet must transit across the rear screen and then the entrance screen, thus causing the pet to walk over both the screens on its way out which helps reduce mess.

In a preferred embodiment of either of the pet litter boxes described above, the secondary basin has a floor that slopes downward toward the main basin. Furthermore, lateral edges of the front opening desirably angle upward and to the rear so that the front opening is similarly angled and the entrance screen is at least partially exposed from directly above. In one embodiment, the enclosure includes mounting structure for supporting the entrance screen and the rear screen, the mounting structure enabling rapid assembly and disassembly of the screens within the enclosure. For example, the mounting structure may comprise outwardly projecting pins in the screens that fit within similarly shaped and positioned holes formed in the enclosure components, or the mounting structure may be a molded-in ledge formed in the enclosure components on which screens are supported. Desirably, the screens are formed by a molded plastic member having internal ribs defining openings therebetween that are oriented vertically when the screens are mounted in the enclosure. An entrance ramp may be coupled to a lower edge of the front opening to assist pets in entering the enclosure. The entrance screen preferably comprises a first portion that curves upward from the front edge of the entrance screen adjacent the front opening and a second portion that extends generally horizontally to the rear edge of the entrance screen. If the enclosure is formed by two components, the mating lips of both the lower tray and the upper lid are reinforced, and a reinforced lip of the lower tray comprises an inverted U-shape defining an upwardly convex rim.

In another aspect, a pet litter box comprises a lower tray defining a main basin sized to contain litter, the lower tray having a lip surrounding a top edge. The lower tray is formed with a negative inner shape and a positive outer shape so that a plurality of lower trays can be stacked on top of one another with the positive outer shape of one nesting closely within the negative inner shape of another without interference. An upper lid of the pet litter box has a lip surrounding a bottom edge that mates with the lip of the lower tray to form an enclosure, the upper lid extending up above the main and secondary basins and having a front opening. The upper tray is also formed with a negative inner shape and a positive outer shape so that a plurality of upper trays can be stacked on top of one another with the positive outer shape of one nesting closely within the negative inner shape of another without interference. Finally, the pet litter box includes an entrance screen sized to span laterally between side walls of the upper lid and extend from the front opening into an interior volume of the enclosure with a generally horizontal section above a floor of the main basin. The screen having a front edge and a rear edge and a front to rear length therebetween such that the entrance screen extends over substantially the entire main basin, and wherein the entrance screen is easily attachable with and detachable from the upper lid. The lateral edges of the front opening preferably angle upward and to the rear so that the front opening is similarly angled and the entrance screen is at least partially exposed from directly above. Also, the mating lips of both the lower tray and the upper lid are desirably reinforced, and a reinforced lip of the lower tray comprises an inverted U-shape defining an upwardly convex rim.

In accordance with one aspect, the present application provides a method of training a cat to use a litter box including providing a litter box having an enclosure defining an interior and a main basin for placing cat litter, and a front opening. The cat is trained to use the litter box for a first period, and after the first period, an entrance screen is assembled with the enclosure. The entrance screen commences at the front entrance and leads into the interior of the enclosure over the main basin. Consequently, a passage for a cat to exit the main basin is created extending to the rear of the enclosure and up and over the entrance screen. The method continues with the step of training the cat to use the litter box with the entrance screen for a second period. Cats tend to habituate over a period of time, and this method allows them to initially easily get into and out of the litter box without having to navigate the entrance screen. After they have become used to the litter box, the entrance screen is added which helps reduce the amount of litter that the cat carries with it out of the litter box.

BRIEF DESCRIPTION OF THE DRAWINGS

Features and advantages of the present invention will become appreciated as the same become better understood with reference to the specification, claims, and appended drawings wherein:

FIG. 3A is a perspective view of the upper lid and a pair of entrance ledge paw-cleaning screens exploded therefrom;

FIG. 3B is a perspective view of the lower tray with a rear paw-cleaning screen and the entrance ramp exploded therefrom;

FIG. 4 is a vertical sectional view through the cat litter box as taken along line 4-4 in FIG. 1, illustrating the exit path of a cat from the litter box over the series of paw-cleaning screens;

FIGS. 5, 5A, 5B and 6 are enlarged views of the interaction between the edges of the upper lid and the lower tray, and respective screens, at both rear and front edges, respectively;

DETAILED DESCRIPTION OF THE PREFERRED EMBODIMENTS

The present invention pertains to litter boxes for pets such as cats, or other small animals. A "pet litter box" refers to a litter box that is suitable for use by cats, but also might be utilized for other domesticated animals.

Figure 1:
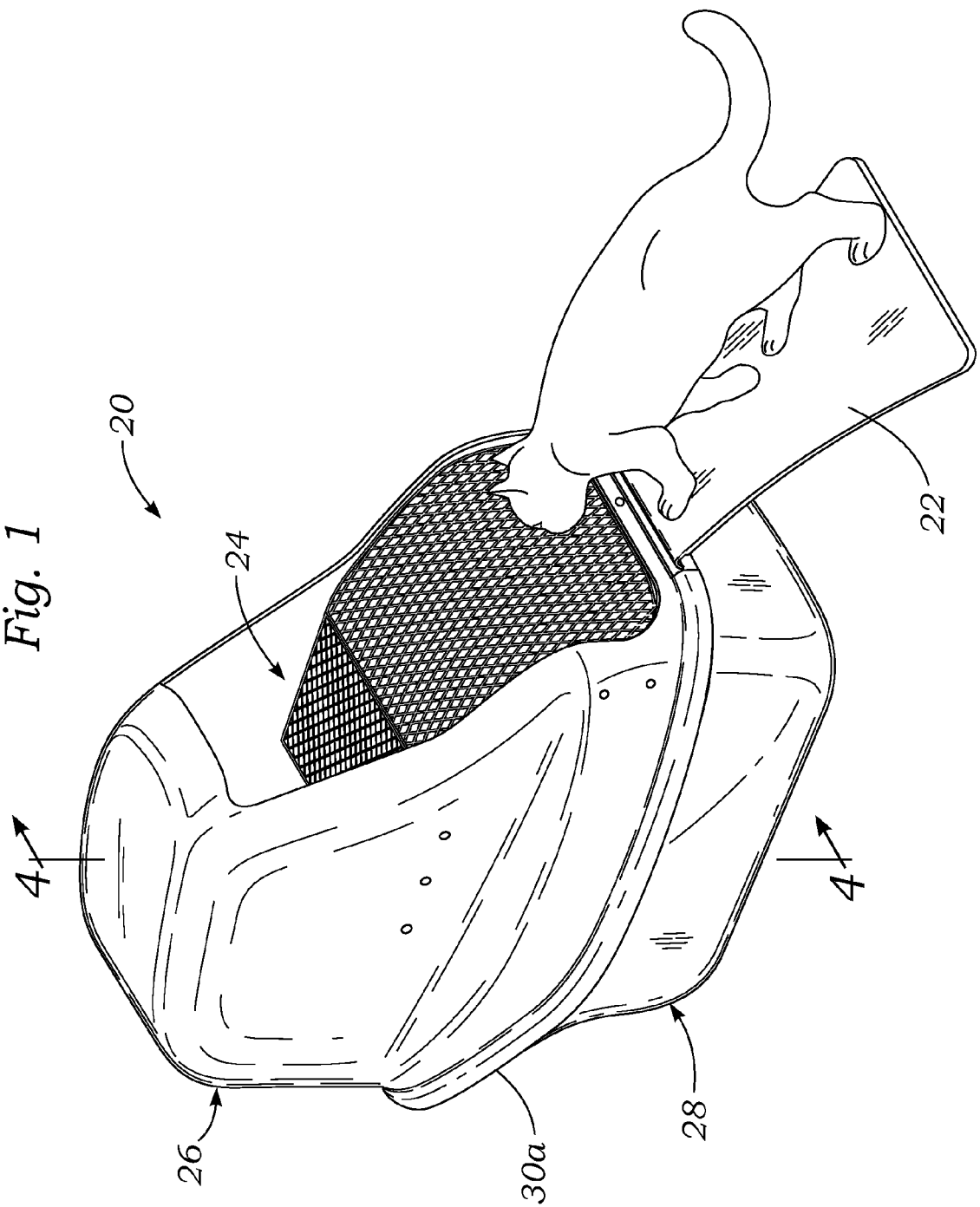
FIG. 1 is a perspective view of a cat litter box as described in the present application showing a cat advancing up an optional entrance ramp toward an opening of the litter box.

FIG. 1 shows a pet litter box 20 of the present application and a cat advancing up an entrance ramp 22 toward an opening 24 thereof. As seen in exploded in FIG. 2, the litter box comprises an upper lid 26 above a lower tray 28. Preferably, both the upper lid 26 and the lower tray 28 are molded from a durable polymer and each has a reinforced lip 30a, 30b, respectively, which mates with the lip of the other component. The assembled upper lid 26 and lower tray 28 provide a complete enclosure aside from the front opening 24. That is, no litter can escape from the assembled litter box 20 except for through the front opening 24. It should be noted that although two main components, the lid 26 and tray 28, are preferably utilized to define the enclosure, it is conceivable that a single piece could be used to form the enclosure, such as if doors or other such closable apertures were provided to provide access to the interior volume thereof for cleaning. Likewise, more than two components could also be used. Further detail concerning the coupling of the lid 26 and tray 28 will be provided below.

Figure 2:
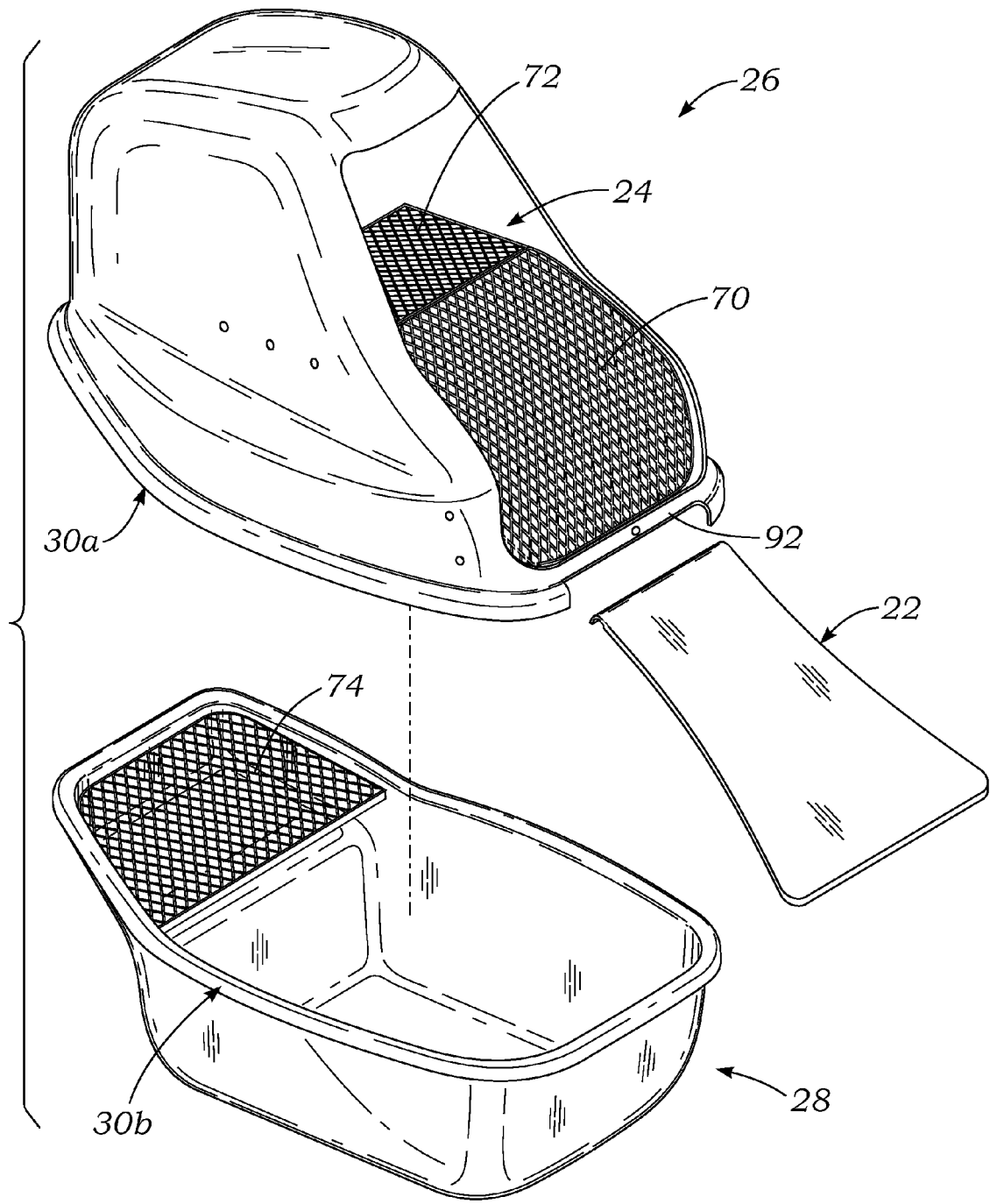
FIG. 2 is an exploded perspective view of the cat litter box of the present application showing an upper lid above a lower tray.

As seen in FIG. 2, and also in the further exploded view of FIG. 3B, the lower tray 28 comprises a main basin 32 that is substantially rectangular in plan view and defined by a floor 33 and three surrounding walls 34 on both front and lateral sides which extend up to the reinforced lip 30b, and a rear wall 36 that ends at a horizontal corner 38 leading to a slightly angled floor 40 of a secondary basin 42. The floor 40 is elevated above the floor 33, and thus defines a ledge above and to the rear of the main basin 32. The secondary basin 42 opens toward the main basin 32 and is otherwise defined by three surrounding walls 44 on both rear and lateral sides which extend up to the reinforced lip 30b. The depth of the main basin 32 from the reinforced lip 30b to the floor 33 is deeper than most other litter boxes, preferably between about 8-10 inches, while the depth of the secondary basin 42 from the reinforced lip 30b to the floor 40 is preferably between about 3-4 inches.

The reinforced lip 30b around the top edge of the lower tray 28 follows a three-dimensional peripheral path with a substantially horizontal portion 50 surrounding the front and sides of the main basin 32, and two lateral portions 52 angling upward and rearward to a horizontal rear portion 54. The two angled portions 52 and rear portion 54 extend on three sides around the secondary basin 42 and generally define a plane that is parallel to the angled floor 40 thereof.

Figure 8:
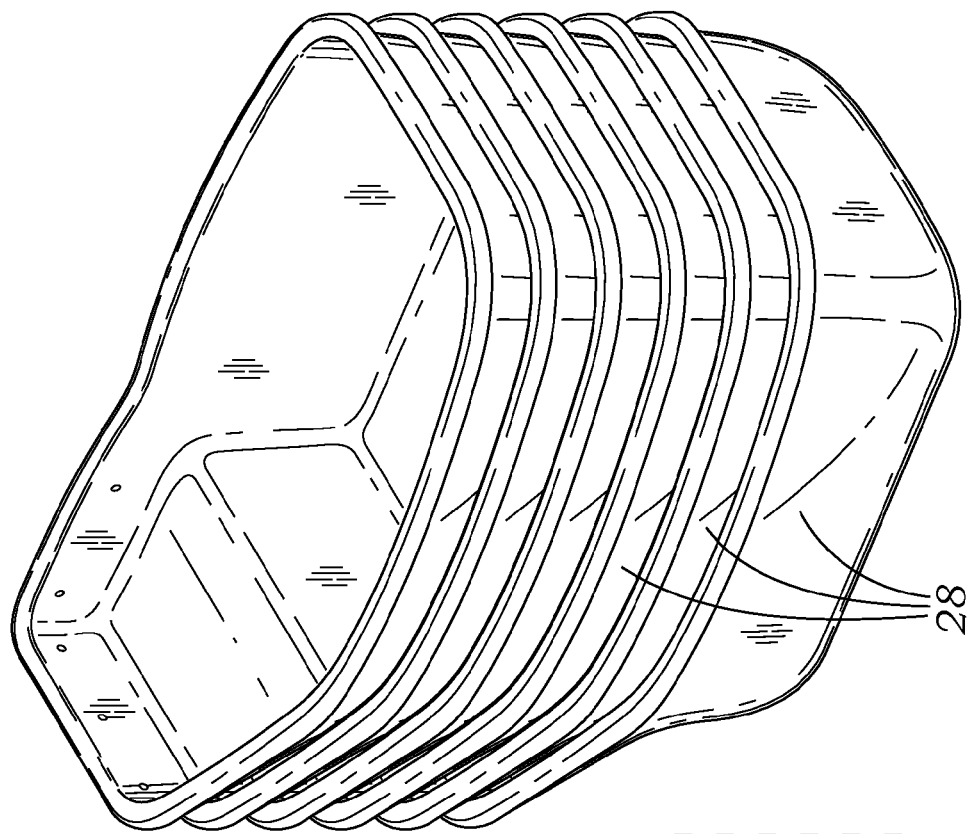
FIGS. 7 and 8 are perspective views of stacked upper lids and lower trays, respectively.

It should be noted that all of the corners defined by the lower tray 28 are rounded and the exterior shape matches the interior contours so that a number of lower trays can be stacked or nested vertically, such as shown in FIG. 8.

With reference still to FIG. 2, and also to the exploded view of FIG. 3A, the reinforced lip 30a of the upper lid 26 tracks the contour of the reinforced lip 30b of the lower tray 28. Namely, the reinforced lip 30a has a substantially horizontal portion (not numbered) around its front edge, and an upwardly angled portion around its rear edge. FIGS. 5, 5A, 5B and 6 illustrates an exemplary mating engagement between the upper reinforced lip 30a and the lower reinforced lip 30b. In a preferred embodiment, the upper reinforced lip 30a defines a downwardly opening channel, while the lower reinforced lip 30b as a substantially inverted "U" shape defining a convex rim that fits within the channel. In this way, the upper lid 26 can easily be fitted over the lower tray 28, with the reinforced lips 30a, 30b engaging and providing an effective seal to prevent escape of any litter particles from within the litter box 20. In a preferred embodiment, the user simply places the upper lid 26 over the lower tray 28, and the reinforced lips 30a, 30b mate in a snug relationship without further closures needed to secure the two components together. However, clasps or other such securing measures may be included to hold the upper lid 26 onto the lower tray 28, such as for traveling.

Figure 12:
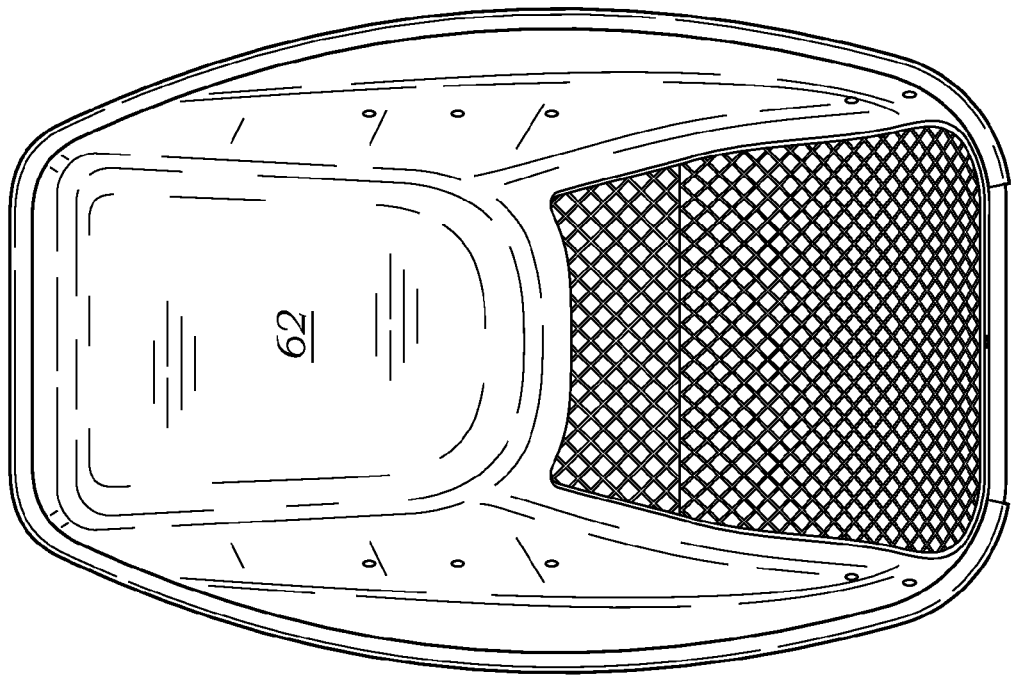
FIG. 12 is a top view of the pet litter box.

As seen in FIG. 3A, the upper lid 26 converges somewhat from the reinforced lip 30a along lateral sidewalls 60 to a top wall 62. The opening 24 extends laterally substantially entire width of the upper lid 26, and from a location adjacent the reinforced lip 30a upward into close proximity with the top wall 62. Front edges 64 of the lateral sidewalls 60 angle rearwardly as they extend up to the top wall 62 such that the opening 24 angles as well and provides better clearance for a cat entering and leaving the litter box 20. Desirably the front opening 24 is angled similarly as its side edges 64 so that the entrance screen is at least partially exposed from directly above, as seen in FIG. 12. Desirably, the angle of the front edges 64 of the sidewalls 60 is between about 15-30°.

Figure 7:
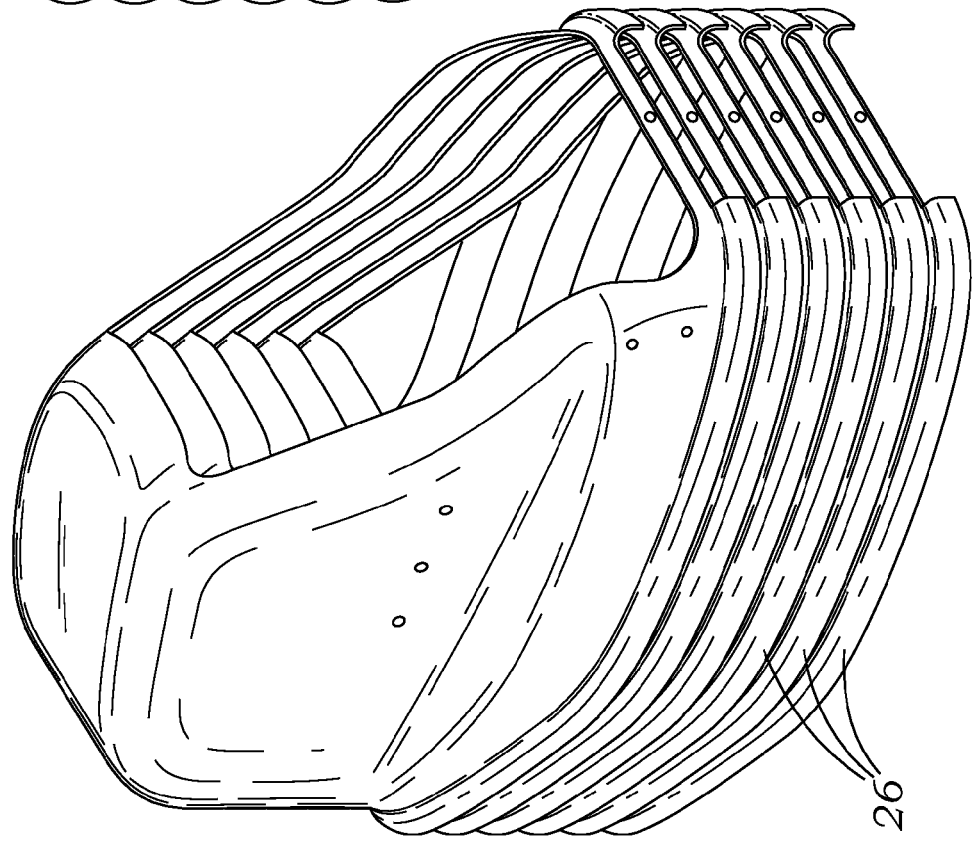

It should be noted that all of the corners defined by the upper lid 26 are rounded and the exterior shape matches the interior contours so that a number of upper lids can be stacked vertically, such as shown in FIG. 7.

The pet litter box 20 described herein includes a series of paw-cleaning screens in its interior that are designed to eliminate the problem of the cat tracking litter particles around the room in which the box is placed. With reference still to FIGS. 2 and 3A-3B, the litter box 20 includes a pair of entrance ledge screens 70, 72 that mount within the upper lid 26, and a rear screen 74 that mount within the lower tray 28.

Each of the screens 70, 72, 74 includes a peripheral frame surrounding a mesh or screen of sufficient density to facilitate passage thereover of a cat, but having openings through which litter particles can drop. In one embodiment, the screens have a plurality of outwardly projecting pins 76 that project into small holes 78 in either the upper lid 26 or lower tray 28. For example, a first entrance ledge screen 70 has three pins 76 on either lateral side, and one at a lower front edge, and the upper lid 26 is provided with complementary holes 78, as shown. In a preferred embodiment, the material of the upper lid 26 and lower tray 28 is such that the sidewalls can be flexed apart a small amount to allow the screens 70, 72, 74 to be positioned such that the pins 76 engage the holes 78, after which the resiliency of the sidewalls is sufficient to hold the screens in place. Further, once the reinforced lips 30a, 30b between the upper and lower halves of litter box 20 mate, the entire structure become substantially more rigid, thus preventing disengagement between the pins 76 and holes 78. The engagement of the pins 76 and the holes 78 is shown in FIGS. 5 and 6.

Another convenient way to support the screens 70, 72, 74 in either the upper lid 26 or lower tray 28 is to provide a ledge or groove molded into the side door and walls, as appropriate. For example, FIG. 3B shows a ledge 79 molded into the three surrounding walls 44 on both rear and lateral sides surrounding the secondary basin 42 of the lower tray 28. The ledge 79 can be seen in cross-section in FIG. 5A. The rear screen 74 simply rests on top of this ledge 79, and may be secured in place with one or more mating pins and holes, or by simply terminating the ledge 79 with a vertical wall at its lower ends. The advantage of this configuration is increased ease of removing and replacing the rear screen 74 for assembly/disassembly, cleaning, or the like. Although not shown, a similar molded-in ledge can be provided in the upper lid 26 to enable easy mounting of the entrance screens 70, 72.

Of course, more secure means of holding the screens within the walls of the litter box are contemplated, such as bayonet-type latches, plastic screws, etc. For example, a nylon bolt 77a is shown in FIG. 5B which avoids corrosion with metallic fasteners. The nylon bolt 77a is shown engaging a nut 77b which can be a separate item or fastened such as with adhesive to an inner wall of the rear screen 74 for ease of assembly. However, the complementary pins 76 and holes 78 are believed sufficient and facilitate easy disengagement of the screens with the respective components of the litter box.

The ability to easily assemble and disassemble the components of the pet litter box 20 provides a number of distinct advantages. First of all, the components regularly require cleaning, which means separating the upper lid 26 and lower tray 28 and removing the screens 70, 72, 74. Additionally, as explained below the ability to remove the entrance screens 70, 72 enables the implementation of a training method for young cats, or for cats not used to litter boxes. Furthermore, elderly or invalid cats may not be able to navigate the S-shaped pathway across the entrance screens 70, 72 and rear screen 74 into the main litter box, and therefore removal of the entrance screens may be necessary.

It should be understood that although two entrance ledge screens 70, 72 are preferred for manufacturing concerns, the two screens could be combined into just one. Indeed, the term "entrance screen" refers to one or more screens having the configuration of the combined screens 70, 72.

The first entrance ledge screen 70 has a downwardly angling front portion 80 that gradually transitions to a substantially horizontal rear portion 82 terminating in a straight rear edge 84. The entrance ledge screen 70 spans laterally between the side walls 60 of the upper lid 26 and is positioned at the front opening. The shape of the screen 70 is somewhat like a tongue, with the downwardly angled front portion 80 occluding a lower portion of the litter box opening 24, as seen in FIG. 2. Furthermore, it should be noted that the width of the first entrance ledge screen 70 is greatest at the front portion 80, and tapers slightly inward toward the rear portion 82 as it conforms to the converging lateral walls 60 of the upper lid 26.

Figure 9:
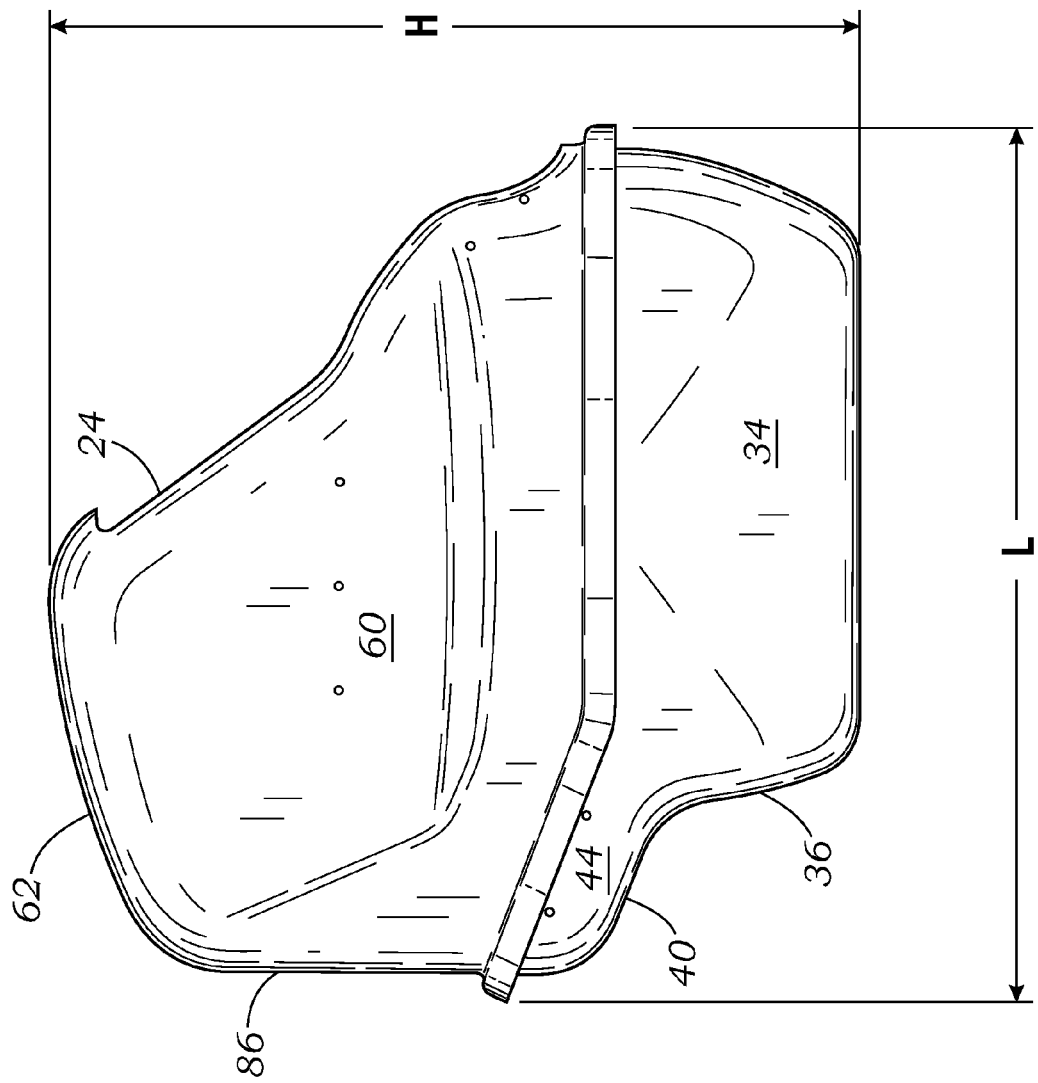
FIG. 9 is a left side view of the pet litter box, the right side view being identical.

The entrance ledge screen 70 extends from a front end of the upper lid 26 into an interior volume of the enclosure with a generally horizontal section above a floor of the main basin 32 that abuts the generally horizontal second screen 72. The entrance screens 70, 72 combined have a front to rear length so as to extend over substantially the entire main basin 32. More specifically, a rear edge 85 of the second entrance ledge screen 72 terminates a distance from a rear wall 86 of the upper lid 26 that provides a spacing S through which a cat can easily pass. In one embodiment, the total length L of the litter box 20, as seen in FIG. 9, is between about 27-32 inches, and the rear edge 85 of the second entrance ledge screen 72 terminates a spacing S of between about ¼-⅓ of that length from the rear wall 86. In absolute terms, the connected entrance screens 70, 72 have a length from front to back of between about 18-23 inches.

The second entrance ledge screen 72 is substantially rectangular and planar, having a straight front edge 87 that abuts the rear edge 84 of the first screen 70. In one embodiment, a pin 88 projects from the front edge 87 and engages a hole (not shown) in the rear edge 84 of the first screen 70 to provide stability for when a cat walks across the two screens. The second entrance ledge screen 72 is fixed between the sidewalls 60 of the upper lid 26 at an elevation that provides a clearance C between it and the top wall 62 through which a cat can easily pass. In one embodiment, the total height H of the litter box 20, as seen in FIG. 9, is between about 26-30 inches, and the second entrance ledge screen 72 provides a clearance C between it and the top wall 62 of between about ⅓ of that height below the top wall 62.

The rear screen 74 has a generally trapezoidal shape that is rounded out to rear corners, and is desirably planar as well. The rear screen 74 also spans laterally between side walls 44 of the lower tray 28 and is positioned above a floor of the secondary basin 42. The rear screen 74 extends from a rear end of the lower tray 28 to a location approximately aligned with a rear edge of the entrance screen 72, as best seen in FIG. 4. The rear screen 74 is spaced vertically below the entrance screen 72 a height h that is sufficient to permit passage of a pet therebetween. As seen in FIG. 3B, the pins 76 on the rear screen 74 fit engage holes 78 distributed around the secondary basin 42 such that the rear screen is suspended above and parallel to the angled floor 40. Again, the rear screen desirably comprises a peripheral frame surrounding a mesh material suitable for a cat to step on and having holes through which litter particles can drop. This rear screen 74 has a steep enough angle to recycle the litter tracking from the cat's paws to be reused in the litter box. The litter falls through to the sloped floor 40 and from there slides back into the main basin 32. This rear screen 74 resides at a completely different level from the upper front screen section and from the lower litter box section. By having 3 different levels, the cat is forced to hop (jump) from one level to another which further enhances the removal (recycling) of the litter tracking from the cat's paws.

The entrance screens 70, 72 also facilitate cleanliness by having mesh through holes that are vertically oriented, as seen in FIG. 6. The width of each of the solid ribs that make up the screen are desirably at least the average diameter of a grain of litter, about ⅛ of an inch. Furthermore, because the entire litter box 20 including screens and fasteners are made of plastic, corrosion is avoided. The upper lid 26 with screens 70, 72 can be lifted off of the lower tray 28 for easy cleaning of all components.

At this point it is important to understand the beneficial placement of the paw-cleaning screens 70, 72, 74, as illustrated in the sectional view of FIG. 4. First of all, the rear screen 74 extends from a rear wall 86 of the litter box 20 approximately as far as the secondary basin 42, or to a point above the horizontal corner 38 between the secondary and main basins. The rear screen 74 provides a step of sorts for the cat when entering or leaving the main basin 32. FIG. 4 illustrates the exit path of a cat from the litter box 20 over the series of paw-cleaning screens 70, 72, 74. In particular, the cat by necessity must leap from the floor of the main basin 32 first to the rear screen 74, and then to the connected entrance screens 70, 72. In doing this, the cat's paws must contact the relatively rough mesh material of the screens which tends to cause any litter particles to fall through the screens, as shown. Indeed, because of the novel positioning of the screens 70, 72, 74, the cat has no choice but to leap from one screen to another such that the sudden impact of its paws on the screens maximizes paw cleaning. Furthermore, the entrance ledge screens 70, 72 recycle the litter tracking from the cat's paws back to be reused into the main basin 32 of the litter box. An attendant benefit of providing the entrance screens 70, 72 is that they present a barrier to other pets entering the litter box 20. Occasionally, dogs find cat litter boxes enticing, and either climb in to make a mess or even eat the contents.

As mentioned, the entrance screens 70, 72 extend substantially over the main basin 32, which nearly completely isolates the main basin from the front opening 24, aside from the passage having the height h between the second entrance screen 72 and the rear screen 74. In a preferred embodiment, the dimensions h, S, and C are substantially equal, providing just enough spacing for the cat to exit the main basin 32, and eventually the front opening 24. By ensuring the dimensions h, S, and C allow room for a cat to pass between the screens and the walls of the enclosure, a passageway is created that permits a cat to traverse to the rear from the main basin 32 and then 180° out the front entrance 24. In one preferred embodiment, the dimensions h, S, and C are between about 8-10 inches, with the spacing S typically being the largest. One specific example has the dimensions h≅8.25 inches, S≅9.25 inches, and C≅9.00 inches.

The first entrance ledge screen 70 also beneficially has a slope at its front end designed to allow the cat to easily enter the cat box and which elevates the rear end and connected second screen 72 enough so that a large volume underneath is created so that the cat can use the litter box within the main basin 32. In one preferred embodiment, the horizontal portion of the entrance ledge screens 70, 72 are spaced between about 16-20 inches, and more preferably about 18 inches, above the floor 33 of the main basin 32. The front end of the first entrance ledge screen 70 is about 9.5 inches off the ground, making it easy for a cat to enter the litter box 20. If needed, the entrance ramp 22 seen in FIG. 1 can be attached for use by kittens, disabled or enfeebled cats. Put another way, the entrance ledge screens 70, 72 slope down at the front to about the border between the upper lid 26 and lower tray 28 for easy access, and then rise up to a height which is about ⅔ of the total height of the litter box 20 which leaves a cat passage between it and the top wall 62, while also vaulting over the main basin 32 to provide adequate volume for the cat to do its business in the main basin. The angle of the slope of the first entrance ledge screen 70 is preferably between about 30-50°, and more preferably about 40°, to provide proper vertical rise without making scaling the slope difficult.

The entrance ledge screens 70, 72 are also removable to allow for easier cleaning and for proper training of the cat to acclimate to using the cat litter box. Lastly, entrance ledge screens 70, 72 is desirably broken up into two removable pieces to allow for easier shipping and storage via space conservation.

Various sizes of litter boxes 20 in accordance with the present disclosure or contemplated for different sizes of animals. However, an exemplary litter box 20 is preferably between about 26-30 inches tall, and between about 19-22 inches wide at the main basin 32, and the dimensions h, S, and C are between about 8-10 inches.

Figure 11:
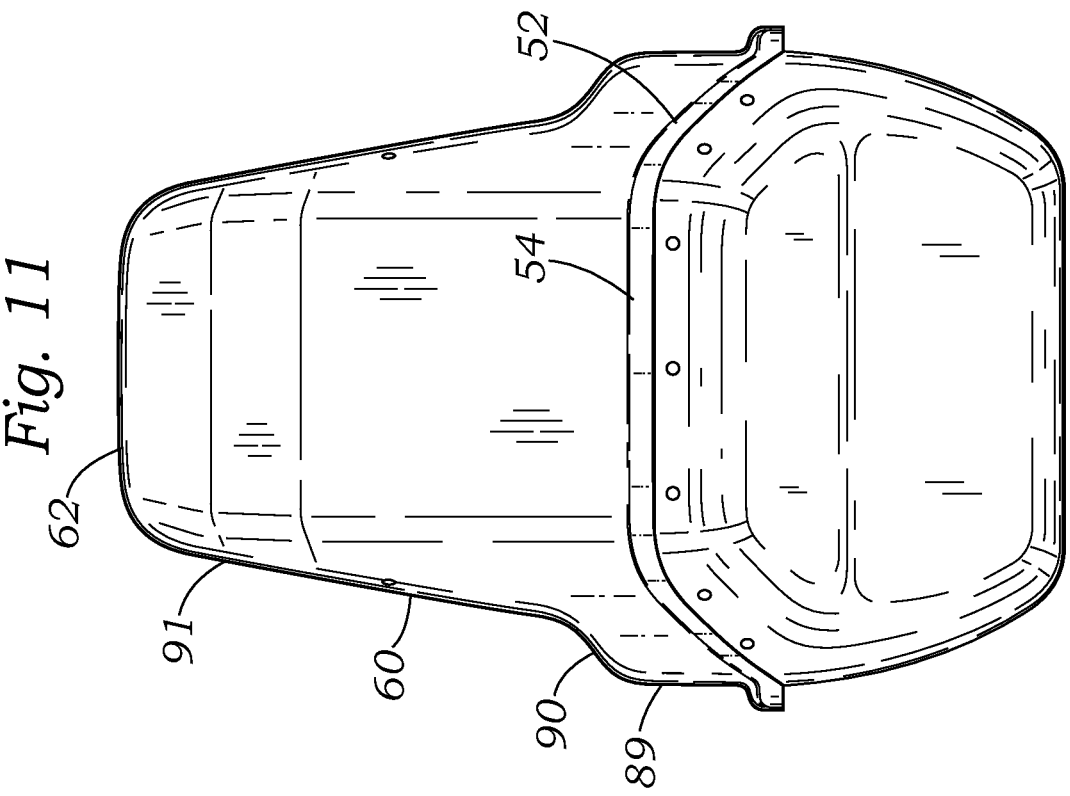
FIG. 11 is a rear view of the pet litter box.
Figure 10:
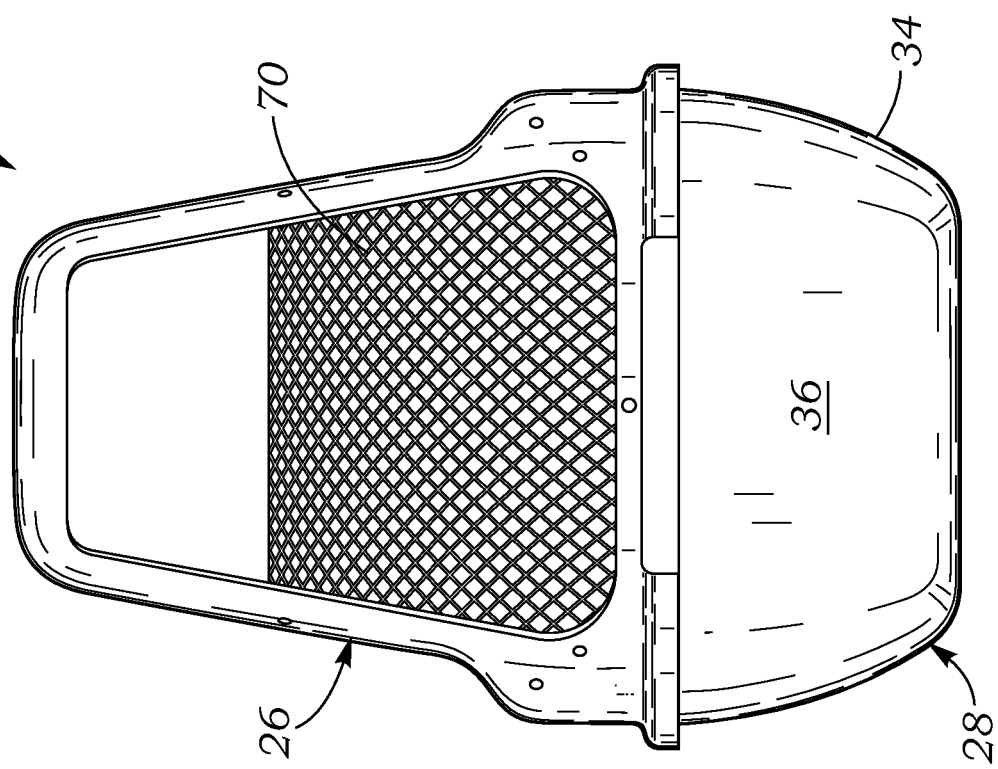
FIG. 10 is a front view of the pet litter box.
Figure 13:
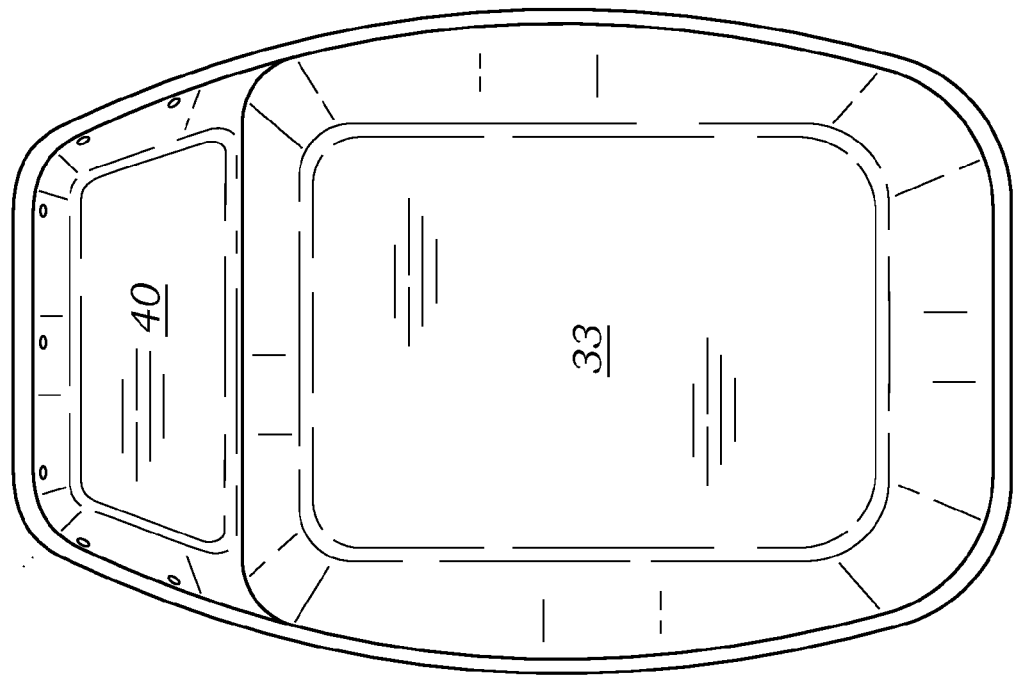
FIG. 13 is a bottom view of the pet litter box.

FIG. 9 is a left side view of the exemplary pet litter box 20, the right side view being identical, while FIGS. 10-13 are orthogonal views, all serving to illustrate the advantageous contours of the litter box. In general, the litter box 20 has a shape which constrains the cat through the interior volume and over the paw-cleaning screens 70, 72, 74, facilitates stacking of the two main components, and presents a pleasing aesthetic exterior. As seen in the various figures, the corners between the various exterior walls are all highly rounded, which helps in stacking and also enhances the ability to clean the interior surfaces, as there are no hard to reach spots. For instance, the corners between the bottom wall 33, side walls 34, and rear wall 36 of the main basin 32 all have relatively large radius curvatures. Further, the side walls 34 and rear wall 36 angle outward slightly as they rise up, which again facilitates stacking and enhances the ability to clean the interior. Likewise, the lateral sidewalls 60 of the upper lid 26 taper inward as they rise up to facilitates stacking. More particularly, the sidewalls 60 each commences at a generally vertical lower portion 89 just above the reinforced lip 30a, above which is an inward shoulder 90, and finally a tapered upper portion 91 that continues generally linearly to the top wall 62, as seen in FIG. 11. This shape permits a plurality of the upper lids 26 to be stacked together, as in FIG. 7. The rear wall 86 desirably remains vertical to provide adequate clearance between it and the rear edge 85 of the entrance screen 72.

In terms of the molded shape of both the upper lid 26 and lower tray 28, each is formed with a negative inner shape and a positive outer shape so that they can each be stacked on top of one another without interference. The terms "negative" and "positive" are intended to convey the ability of the upper lid 26 and lower tray 28 to respectably stack or nest on top of one another for ease of shipping, storage, and display. "Negative" is typically primarily concave while "positive" is primarily convex, but the terms are not intended to mean that the components curve toward one side or the other in all aspects, just that there is a positive side that nests easily and closely within a negative side without any interference therebetween. The lack of interference means that one part can easily be lifted straight off the other part without requiring the detachment of any lips, edges or other structures that might otherwise catch. One benefit of this stackability is in a compact retail display. A number of upper lids 26 can be stacked next to a number of lower trays 28, both adjacent to a container having the same number of discreetly packaged ancillary parts, such as the entrance and rear screens 70, 72, 74. Each additional component placed on a stack of similar components thus adds essentially the wall thickness of that component in overall height to the stack.

With regard to the upper lid 26, the beneficial angle of the front opening 24, as best seen in FIG. 9, provides good a vertical clearance for the cat upon entering the litter box 20. With reference also to FIG. 2, the front entrance screen 70 commences at a narrow horizontal strip 92 extending across the lower edge of the opening 24. The strip 92 helps reinforce the rigidity of the upper lid 26, and in particular generally maintains lateral spacing between the side walls 60. Preferably, the strip 92 features a least one of the holes 78 that receives a front pin 76 on the front entrance screen 70.

The figures appended hereto demonstrate a cat litter box 20 uniquely designed to remove cat litter from the cat's paws so that cat litter always remains in the box and not outside the box, creating a litter tracking mess. This is accomplished by making the cat walk on the multilevel series of litter trapping screens 70, 72, 74. The screens are advantageous because they not only remove litter from the cat paws but also are positioned so as to recycle the litter back into the usable litter area. The plurality of screens from the top and bottom of the litter box are removable to allow for efficient stacking of the top units on each other and the bottom units on each other.

A unique method of use includes removing the top screens 70, 72, 74 while the rest of the cat litter box is assembled this allows time from 3 days to a week for the cat to acclimate to just the hooded box and their normal kitty litter without the hindrance of the screens. Once the cat is acclimated to the litter box without the entrance screen, the screens 70, 72 are assembled with the upper lid 26, such as by simply placing the screens onto the molded ledge 79 as in FIG. 5A, or with the pins 76 or nylon screws 77 of FIGS. 5 and 5B. Once assembled, the upper lid 26 with attached front screens may be removed and the cat placed onto the litter section of the box, and the upper lid 26 replaced with the cat inside the box. The cat is then encouraged to exit the box manually by reaching inside to guide the cat outside the box. This exercise is repeated (usually only 3-5 times) until the cat can easily find the way out of the box. Subsequently, the litter box 20 can be cleaned by simply lifting off the upper lid 26 from the lower tray 28. The configuration of the reinforced edges 30a, 30b makes it very simple to lift the upper lid 26 to use the litter scoop and to train the cat to use the unique cat litter box. For example, the upper lid 26 can be lifted using the top of the opening 24 which is shaped as a handle to place the cat in the lower tray 28, after which the lid can be replaced with the cat inside. Lastly, the optional removable ramp 22 seen in FIG. 1 helps elderly, injured, or very young cats get into and out of the cat box. This removable ramp 22 attaches and detaches from front of the lower tray 28.

While the invention has been described in its preferred embodiments, it is to be understood that the words which have been used are words of description and not of limitation. Therefore, changes may be made within the appended claims without departing from the true scope of the invention.

What is claimed is:

1. A pet litter box, comprising: an enclosure defining a lower main basin sized to contain litter and a secondary basin raised up from the main basin at a rear of the enclosure, the enclosure further including a lid over the main basin and secondary basin having a front opening large enough to permit passage of a pet; an entrance screen spanning laterally between side walls of the enclosure and positioned at the front opening, the entrance screen extending from the front opening into an interior volume and below a top wall of the lid, the entrance screen having a front edge and a rear edge and a front to rear length therebetween such that the entrance screen extends over substantially the entire main basin, the entrance screen having a first portion that slopes upward from the front edge thereof adjacent the front opening, thus forming an entrance ramp and raising the entrance screen above a floor of the main basin in a rearward direction, the entrance screen further having a second portion that extends generally horizontally to the rear edge of the entrance screen; and a rear screen spanning laterally between side walls of the enclosure and positioned above a floor of the secondary basin, the rear screen extending from a rear end of the enclosure to a location approximately aligned with the rear edge of the entrance screen, the rear screen being spaced vertically below the entrance screen a height sufficient to permit passage of a pet therebetween and being suspended above the floor of the secondary basin such that any litter particles that fall through the rear screen are recycled into the litter box.

2. The litter box of claim 1, wherein the secondary basin has a floor that slopes downward toward the main basin.

3. The litter box of claim 1, wherein lateral edges of the front opening angle upward and to the rear so that the front opening is similarly angled and the entrance screen is at least partially exposed from directly above.

4. The litter box of claim 1, wherein the enclosure includes mounting structure for supporting the entrance screen and the rear screen, the mounting structure enabling rapid assembly and disassembly of the screens within the enclosure.

5. The litter box of claim 4, wherein the enclosure is formed by two separable components, a lower tray defining the main basin and an upper lid that mates with the lower tray, and wherein the entrance screen mounts within the upper lid, and the rear screen mounts within the lower tray.

6. The litter box of claim 1, wherein the screens are formed by a molded plastic member having internal ribs defining openings there between that are oriented vertically when the screens are mounted in the enclosure.

7. The litter box of claim 1, further including an entrance ramp coupled to a lower edge of the front opening to assist pets in entering the enclosure.

8. A pet litter box, comprising: a single piece molded lower tray defining a main basin sized to contain litter and a secondary basin raised up from the main basin at a rear end of the tray, the lower tray having a lip surrounding a top edge; a single piece molded upper lid having a lip surrounding a bottom edge that mates with the lip of the lower tray to form an enclosure, the upper lid extending above the main and secondary basins and having a front opening; an entrance screen spanning laterally between side walls of the upper lid and extending from the front opening into an interior volume of the enclosure, the entrance screen having a front edge and a rear edge and a front to rear length therebetween such that the entrance screen extends over substantially the entire main basin, the entrance screen having a first portion that slopes upward from the front edge thereof adjacent the front opening, thus forming an entrance ramp and raising the entrance screen above a floor of the main basin in a rearward direction, the entrance screen further having a second portion that extends generally horizontally to the rear edge of the entrance screen; and a rear screen spanning laterally between side walls of the lower tray and positioned above a floor of the secondary basin, the rear screen extending from a rear end of the lower tray to a location approximately aligned with the rear edge of the entrance screen, the rear screen being spaced vertically below the entrance screen a height sufficient to permit passage of a pet therebetween and being suspended above the floor of the secondary basin such that any litter particles that fall through the rear screen are recycled into the litter box.

9. The litter box of claim 8, wherein the secondary basin has a floor that slopes downward toward the main basin.

10. The litter box of claim 8, wherein lateral edges of the front opening angle upward and to the rear so that the front opening is similarly angled and the entrance screen is at least partially exposed from directly above.

11. The litter box of claim 8, wherein the lower tray includes mounting structure for supporting the rear screen that enables rapid assembly and disassembly of the rear screen from a lower tray.

12. The litter box of claim 11, wherein the mounting structure comprises outwardly projecting pins in the rear screen that fit within similarly shaped and positioned holes formed in the lower tray.

13. The litter box of claim 11, wherein the mounting structure comprises a molded-in ledge formed in the lower tray on which the rear screen is supported.

14. The litter box of claim 8, wherein the screens are formed by a molded plastic member having internal ribs defining openings there between that are oriented vertically when the screens are mounted in the enclosure.

15. The litter box of claim 14, wherein the entrance screen comprises a first portion that curves upward from the front edge of the entrance screen adjacency front opening and a second portion that extends generally horizontally to the rear edge of the entrance screen.

16. The litter box of claim 8, wherein the mating lips of both the lower tray and the upper lid are reinforced, and a reinforced lip of the lower tray comprises an inverted U-shape defining an upwardly convex rim.

17. A pet litter box, comprising: a lower tray defining a main basin sized to contain litter and a secondary basin raised up from the main basin at a rear end of the tray, the lower tray having a lip surrounding a top edge, wherein the lower tray is formed with a negative inner shape and a positive outer shape that converges from the top edge toward a lower floor so that a plurality of lower trays can be stacked on top of one another with the positive outer shape of one nesting closely within the negative inner shape of another without interference; an upper lid having a lip surrounding a bottom edge that mates with the lip of the lower tray to form an enclosure, the upper lid extending up above the main basin and having a front opening, wherein the upper lid is formed with a negative inner shape and a positive outer shape that converges from the bottom edge toward a top wall so that a plurality of upper lids can be stacked on top of one another with the positive outer shape of one nesting closely within the negative inner shape of another without interference; an entrance screen sized to span laterally between side walls of the upper lid and extend from the front opening into an interior volume of the enclosure with a generally horizontal section above a floor of the main basin, the screen having a front edge and a rear edge and a front to rear length therebetween such that the entrance screen extends over substantially the entire main basin, and wherein the entrance screen is easily attachable with and detachable from the upper lid; and a rear screen spanning laterally between side walls of the lower tray and positioned above a floor of the secondary basin, the rear screen extending from a rear end of the lower tray to a location approximately aligned with the rear edge of the entrance screen, the rear screen being spaced vertically below the entrance screen a height sufficient to permit passage of a pet therebetween and being suspended above the floor of the secondary basin such that any litter particles that fall through the rear screen are recycled into the litter box.

18. The litter box of claim 17, wherein the lower tray defines a secondary basin raised up from the main basin at a rear end of the tray, and the litter box further includes a rear screen spanning laterally between side walls of the lower tray and positioned above a floor of the secondary basin, the rear screen extending from a rear end of the lower tray to a location approximately aligned with the rear edge of the entrance screen, the rear screen being spaced vertically below the entrance screen a height sufficient to permit passage of a pet therebetween.

19. The litter box of claim 17, wherein lateral edges of the front opening angle upward and to the rear so that the front opening is similarly angled and the entrance screen is at least partially exposed from directly above.

20. The litter box of claim 17, wherein the mating lips of both the lower tray and the upper lid are reinforced, and a reinforced lip of the lower tray comprises an inverted U-shape defining an upwardly convex rim.

* * * * *